United States Patent Office 3,631,033
Patented Dec. 28, 1971

3,631,033
STEROIDS
Giangiacomo Nathansohn and Giorgio Winters, Milan,
Italy, assignors to Gruppo Lepetit S.p.A., Milan, Italy
No Drawing. Filed May 1, 1969, Ser. No. 821,149
Claims priority, application Italy, May 3, 1968,
16,029/68
Int. Cl. C07c 173/00
U.S. Cl. 260—239.55                    18 Claims

ABSTRACT OF THE DISCLOSURE

Compounds selected from 16α-hydroxy-17α-amino-steroides, steroido-[17α,16α-d]-oxazolidines and steroido-[17α,16α-d]-oxazolidino-[3',4'-c] - 2H - tetrahydro-1,3-oxazine-2"-ones. The second and third classes of steroids are active as anti-inflammatory agents and progestinic.

---

The present invention relates to the synthesis of steroido-oxazolines, steroido-oxazolidines, steroido-oxazolidino-oxazines and of intermediates convertible into said classes of steroids, to the novel steroids so produced and to pharmaceutical compositions containing the therapeutically active compounds.

More particularly, the intermediates useful for the preparation of the end compounds herein described are 16α-hydroxy-17α-aminosteroids, which are prepared from a steroido-[17α,16α-d]-oxazoline unsubstituted at position 2' by hydrolysis with a strong acid according to the following reaction:

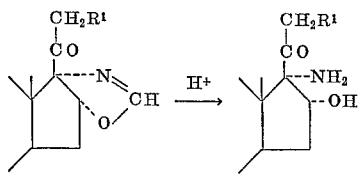

In the above formula, wherein R¹ represents hydrogen, hydroxy or acyloxy, only ring D of the steroid molecule is represented, i.e. the cyclopentane ring. As a matter of fact, the hydrolytic cleavage of the oxazoline ring may be carried out on every steroido-oxazoline of the above partial structure, provided no other group is present which might be altered by the acidic treatment. Preferably, the hydrolytic cleavage is carried out by refluxing a mixture of dilute aqueous hydrochloric acid and a lower alkanol, whereby the hydrochloride of the 16α-hydroxy-17α-aminosteroid is obtained; from which the free amine may be isolated, if desired, by conventional procedures.

As above stated, the 16α-hydroxy-17α-aminosteroid is an intermediate compound for other substances, which are the end products of the present invention, and possess valuable pharmacological properties. The principal end products of the invention are represented by Formulas I (steroido-[17α,16α-d]-oxazolines), II (steroido-[17α,16α-d]-oxazolidines) and III (steroido-[17α,16α-d]oxazolidino-[3,4-c]-oxazines).

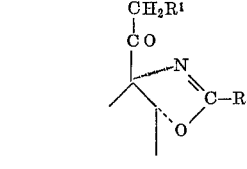 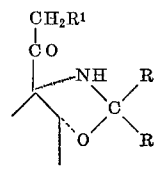

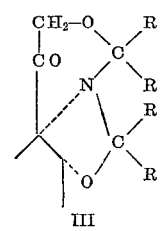

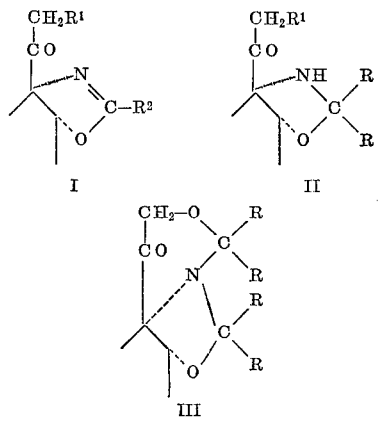

In any of the above formulas R² represents lower alkyl and aryl, each of the symbols R has the significance of hydrogen, lower alkyl and aryl and R¹ means hydrogen, hydroxy and acyloxy.

The compounds of the Formula I form i.a. the subject of British Pats. 1,077,392 and 1,077,393, wherein a different synthesis is described.

Also the starting steroido-oxazolines useful for preparing the intermediate 16α-hydroxy-17α-aminosteroids are subject of said British patents. However, it has now been found that the steroido-oxazolines unsubstituted at position 2' are conveniently used for the preparation of the steroido-oxazolines substituted at position 2' by an alkyl or aryl radical through the intermediate 16α-hydroxy-17α-aminosteroids, i.e. through the following steps:

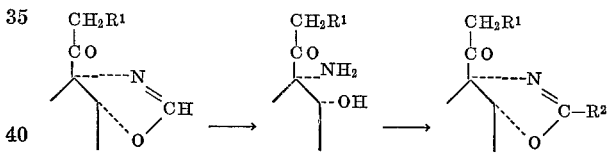

After the first step has been carried out as above indicated, the hydrochloride of the 16α-hydroxy-17α-aminosteroid is heated with a carboxylic acid anhydride in the presence of a tertiary aminic base, such as pyridine or triethyl or trimethylamine, to give the 2'-substituted steroido-oxazoline in high yield.

The compounds of the Formulas II and III above are obtained from the intermediate 16α-hydroxy-17α-aminosteroids through a condensation with a carbonyl compound RCOR, in which the symbols R are as above defined, or a functional derivative of the carbonyl group, such as an acetal. The condensation may be carried out in the presence of water or under anhydrous conditions, at a temperature between 0° and 100° C. and more when the functional derivative of the carbonyl compound boils above 100° C. without decomposition.

It is to be noted that, when R in the generic formula of the 16α-hydroxy-17α-aminosteroid above is a free hydroxy group, the reaction gives a mixture of II and III in various proportions, which can easily be separated through common chromatographic procedures or by fractional crystallization. In other cases one of the two components of the mixture predominates, occasionally in such a way as to result the only practically recoverable product. Although a general rule cannot be established, it may be suggested that formation of the steroido-oxazolidine II is predominant when the 16α-hydroxy-17α-aminosteroid is made to react with a ketone, while an aldehyde tends to give the steroido-oxazolidino-oxazine III. However, the course of the reaction is also greatly influenced by the size of the groups present in the carbonyl compound. By other words, the steric hindrance of the alkyl and aryl groups R may play a role in shifting the reaction toward the formation of the steroido-oxazolidines II. Obviously, when the steroido-oxazolidines of the generic Formula II have a free 21-hydroxy group, they may be converted into the steroido-oxazolidino-oxazines III by treatment with the carbonylic compound RCOR above indicated, provided also in this case the steric hindrance does not impede this reaction. As a matter of fact, when at least one of the symbols R in the Formula II above is hydrogen, treatment with a carbonyl compound gives the expected streoido-oxazolidino-oxazine.

As above stated, the compounds having the steroid cyclopentane ring D fused as in any of the Formulas I, II and III may have a large variety of structures in the other three rings of the steroid nucleus. While it is referred to the examples for some indicative preparations, a lot of different structures can be prepared. For instance, one or more double bonds may be present at positions 1,4,6,9(11). Oxygenated groups, such as a ketonic oxygen or a hydroxyl, may be present at positions 3 and/or 11. Also it is possible to carry out the reactions hereinbefore described on steroids bearing a 9-halogen substituent. It it therefore intended that the following examples are only illustrative of the invention, but are far from establishing the limits of applicability of the same.

As above stated, the new compounds herein described show useful pharmacological properties. More particularly, they show a very high order of antiinflammatory activity.

This activity is shared by practically all compounds possessing one of the following generic formulas:

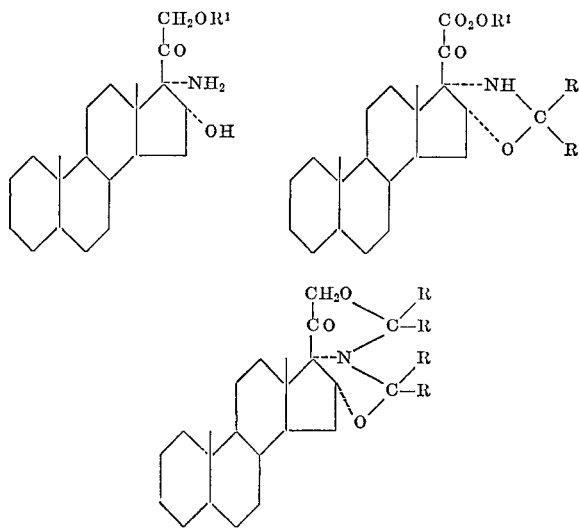

in which $R^1$ represents hydrogen or acyl, the symbols R represents hydrogen, lower alkyl and aryl groups and one or two oxygenated functions may be present at positions 3 and/or 11, a halogen atom may be present at position 9 and double bonds may exist between positions 1, 2 and/or 9, 11.

Moreover, the steroid-oxazolidines lacking an oxygenated group at position 21 are provided with an outstanding progestinic activity.

EXAMPLE 1

Preparation of 3β,11β-dihydroxy-5α-pregnane-20-one-[17α,16α-d]-2′-methyloxazoline 3-acetate To 0.5 g. of 3β,11β-dihydroxy-5α-pregnene-20-one-[17α,16α-d]-oxazoline 6.2 ml. of methanol and 6.2 ml. of 10% aqueous hydrochloric acid are added and the mixture is refluxed for 10 minutes. The solvent is then evaporated, the residue is taken up repeatedly with ethanol, and the solvent distilled off each time. At the end the residue is dissolved in ethanol and diethyl ether is added to the solution. A precipitate of 17α-amino-3β,11β,16α-trihydroxy-5α-pregnan-20-one hydrochloride is soon formed. Yield 0.17 g., M.P. 260° with decomposition.

*Analysis.*—Calculated for $C_{21}H_{35}NO_4$ HCl (percent): C, 62.70; H, 9.02. Found (percent): C, 62.55; H, 8.89.

To 1 g. of 17α-amino-3β,11β,16α-trihydroxy-5α-pregnan-20-one hydrochloride 5 ml. of anhydrous pyridine and 2 ml. of acetic anhydride are added. The mixture is allowed to react for 6 hours at room temperature, and then heated for 0.5 hour at 60° C., then it is poured into 25 ml. of water and 4 ml. of concentrated hydrochloric acid. The formed precipitate is collected, recrystallized from methanol and dried at 80° C. in vacuo. An amount of 1 g. of 3β,11β-dihydroxy-5α-pregnan-20-one-[17α,16α-d]-2′-methyl-oxazoline 3-acetate is obtained; M.P. 238–240° C.

*Analysis.*—Calculated for $C_{25}H_{37}NO_5$ (percent): C, 69.57; H, 8.64; N, 3.24. Found (percent): C, 69.94; H, 8.56; N, 3.18.

EXAMPLE 2

Preparation of 3β,11β-dihydroxy-5α-pregnane-20-one-[17α,16α-d]-2′-ethyloxazoline 3-propionate To 0.20 g. of 17α-amino-3β,11β,16α - trihydroxy-5α-pregnan-20-one hydrochloride prepared as described in Example 1, 1 ml. of anhydrous pyridine and 0.4 ml. of propionic anhydride are added. The mixture is kept at 95–100° C. for 30 minutes, then is poured into 10 ml. of water and 1 ml. of concentrated hydrochloric acid. The precipitate is collected, dried at 70° C. in vacuo, and recrystallized from methanol, to give 0.19 g. of 3β,11β-dihydroxy - 5α - pregnan - 20-one-[17α,16α-d]-2′-ethyloxazoline 3-propionate. M.P. 188–190° C.

*Analysis.*—Calculated for $C_{21}H_{41}O_5N$ (percent): C, 70.55; H, 8.99. Found (percent): C, 70.00; H, 8.67.

EXAMPLE 3

Preparation of 3β,11β-dihydroxy-5α-pregnan-20-one-[17α,16α-d]-2′-propyloxazoline 3-butyrate An amount of 0.20 g. of 17α-amino-3β,11β,16α-trihydroxy-5α-pregnan-20-one hydrochloride, prepared as described under Example 1, is reacted with 0.4 ml. of butyric anhydride in 1 ml. of anhydrous pyridine. The mixture is heated for 30 minutes at 100° C., then is allowed to cool and additioned with water. The formed steroid is extracted with methylene dichloride, the organic phase is separated and washed to neutral with water. Finally the solvent is distilled off and the residue recrystallized from methanol. Yield 0.18 g. of 3β,11β-dihydroxy-5α-pregnan-20-one-[17α,16α-d]-2′-propyloxazoline 3-butyrate. M.P. 128–131° C.

*Analysis.*—Calculated for $C_{29}H_{45}NO_5$ (percent): C, 71.42; H, 9.30. Found (percent): C, 71.10; H, 9.38.

EXAMPLE 4

Preparation of 3β,11β-dihydroxy-5α-pregnan-20-one-[17α,16α-d]-2′-methyloxazolidine An amount of 1 g. of 17α-amino-3β,11β,16α-trihydroxy-5α-pregnan-20-one hydrochloride, prepared as described in Example 1, is dissolved in 12 ml. of water and additioned at 0° C. with 1 ml. of acetaldehyde. The temperature is allowed to rise to room temperature. After standing overnight, the formed crystals are collected and the filtrate is extracted with chloroform. The chloroform is distilled off, and the residue is combined with the previously obtained crystals and recrystallized from isopropyl alcohol. An amount of 0.97 g. of 3β,11β-dihydroxy-5α-pregnan-20-one-[17α,16α-d]-2′-methyloxazolidine is obtained; M.P. 246–250° C.

*Analysis.*—Calculated for $C_{23}H_{37}NO_4$ (percent): C, 70.55; H, 9.53; N, 3.58. Found (percent): C, 70.16; H, 9.49; N, 3.80.

EXAMPLE 5

Preparation of 3β-hydroxy-5α-pregnan-11,20-dione-[17α,16α-d]-2′,2′-dimethyloxazolidine An amount of 0.350 g. of 3β-hydroxy-5α-pregnan-11,20-dione-[17α,16α-d]-oxazoline 3-formate is suspended in 5 ml. of methanol and 5 ml. of 10% aqueous hydrochloric acid and refluxed for 30 minutes.

The reaction mixture is allowed to cool, filtered from any insoluble, and the methanol distilled off in vacuo.

The residue is neutralized with a 10% aqueous solution of sodium bicarbonate. The solid is collected, washed with water and dried. Yield 0.25 g. of 17α-amino-3β,16α-dihydroxy-5α-pregnane-11,20-dione. M.P. 170–74° C. with decomposition.

*Analysis.*—Calculated for $C_{21}H_{31}NO_4$ (percent): C, 69.76; H, 8.85; N, 3.87. Found (percent): C, 69.52; H, 8.90; N, 3.91.

To 1.85 g. of 17α-amino-3β,16α-dihydroxy-5α-pregnane-11,20-dione, 24.5 ml. of 2,2-dimethoxypropane, 12.3 ml. of dimethylformamide and traces of p-toluenesulfonic acid are added. The solid quickly dissolves and the solution is stirred for one hour at room temperature, then is refluxed for 4 hours. The solvent is then removed by distilling in vacuo and the residue is dissolved in acetone and precipitated by dilution with hexane to give 0.98 g. of 3β-hydroxy-5α-pregnane-11,20-dione-[17α,16α-d]-2′,2′-dimethyloxazolidine. M.P. 226–228° C.

*Analysis.*—Calculated for $C_{24}H_{37}NO_4$ (percent): C, 71.43; H, 9.24; N, 3.47. Found (percent): C, 71.32; H, 9.26; N, 3.27.

EXAMPLE 6

Preparation of 21-hydroxy-pregna-1,4,9(11)-triene-3,20-dione-[17α,16α-d]-2′-methyloxazolidine and androsta-1,4,9(11)-triene-3-one-[17α,16α-d]-2′-methyloxazolidino-[3′,4′-c]-2″-methyl-2H-tetrahydro-1,3-oxazin-5″-one An amount of 0.5 g. of 21 hydroxy-pregna-1,4,9(11)-triene 3,20-dione-[17α,16α-d]-oxazoline 21-acetate is refluxed for 15 minutes with 6.2 ml. of methanol and 6.2 ml. of 10% aqueous solution of hydrochloric acid. The solvent is evaporated to dryness, and the residue is taken up twice with ethanol and twice brought to dryness. The solid which remains is then crystallized from ethanol-diethyl ether 3:1 to give 0.4 g. of 17α-amino-16α,21-dihydroxy-pregna-1,4,9(11)-triene-3,20-dione hydrochloride. No melting point was observed up to 260° C., but only a partial decomposition.

*Analysis.*—Calculated for $C_{21}H_{28}NClO_4$ (percent): C, 64.0; H, 7.16; Cl, 9.00. Found (percent): C, 63.97; H, 7.30; Cl, 9.48.

An amount of 0.5 g. of 17α-amino-16α,21-dihydroxy-pregna-1,4,9(11)-triene-3,20-dione hydrochloride is suspended in 5 ml. of water, and additioned with 1 ml. of acetaldehyde at room temperature. The mixture is allowed to stand overnight, then the solution is extracted with chloroform. The chloroform solution is evaporated to dryness in vacuo and the residue chromatographed on a column prepared with 8 g. of silicagel, using a mixture of benzene-methanol 98:2 as the eluent. Fractions of eluate consisting each of 25 ml. are collected. The first and second fractions of eluate are combined and after removing the solvent by evaporation in vacuo, a residue consisting of androsta-1,4,9(11)-trien-3-one[17α,16α-d]-2′-methyloxazolidino-[3′,4′-c]-2″-methyl-2H-tetrahydro-1,3-oxazin-5″-one is obtained, which is recrystallized from ethanol. Yield 170 mg. M.P. 260–263° C.

*Analysis.*—Calculated for $C_{25}H_{31}NO_4$ (percent): C, 73.32; H, 7.63; N, 3.42. Found (percent): C, 73.15; H, 7.58; N, 3.50.

From the 4th to 6th fractions of eluate the 21-hydroxy-pregna-1,4,9(11)-triene-3,20-dione-[17α,16α-d]-2′-methyloxazolidine was likewise obtained. Yield 0.200 g. M.P. 240–250° C.

*Analysis.*—Calculated for $C_{23}H_{29}NO_4$ (percent): C, 72.03; H, 7.62; N, 3.65. Found (percent): C, 71.85; H, 7.70; N, 3.80.

EXAMPLE 7

Preparation of 9α-fluoro-11β-21-dihydroxy-pregna-1,4-diene-3,20-dione-[17α,16α-d]-2′,2′-dimethyloxazolidine An amount of 100 mg. of 9α-fluoro-11β,21-dihydroxy-pregna-1,4-dien-3,20-dione-[17α,16α-d]-oxazoline is refluxed with 4 ml. of ethanol and 1.5 ml. of 10% hydrochloric acid, during 30 minutes. The solvent is then removed in vacuo and the residue is taken up several times with ethanol, distilling off the ethanol each time to dryness. Finally the solid is dissolved in ethanol, precipitated with diethyl ether and recrystallized from ethanol. The 17α-amino-9α-fluoro 11β,16α,21-trihydroxy-pregna-1,4-diene-3,20-dione hydrochloride is obtained in form of crystals, which do not melt up to 280° C. Yield 85 mg.

*Analysis.*—Calculated for $C_{21}H_{28}FNO_5HCl$ (percent): C, 58.66; H, 6.80; Cl, 8.25. Found (percent): C, 57.81; H, 6.86; Cl, 8.30.

A suspension of 2 g. of 17α-amino-9α-fluoro-11β,16α,21-trihydroxy-pregna-1,4-diene 3,20-dione hydrochloride in 11 ml. of dimethylformamide and 24 ml. of 2,2-dimethoxypropane is refluxed for 2 hours.

After cooling at room temperature the mixture is filtered from the solid, treated with charcoal and again filtered. The filtrate is evaporated to dryness in vacuo, and the residue is first washed with 5 ml. of methanol, then recrystallized from 150 ml. of isopropyl alcohol, to give 0.97 g. of 9α-fluoro-11β,21-dihydroxy-pregna-1,4-diene-3,20-dione-[17α,16α-d]-2′,2′-dimethyloxazolidine. M.P. 290° C.

*Analysis.*—Calculated for $C_{24}H_{32}FNO_5$ (percent): C, 66.50; H, 7.44; N, 3.23. Found (percent): C, 66.61; H, 7.70; N, 3.24.

EXAMPLE 8

Preparation of 9α-fluoro-11β-hydroxy-androsta-1,4-dien-3-one-[17α,16α-d]-oxazolidino-[3′,4′-c]-2H-tetrahydro-1,3-oxazin-5″-one An amount of 0.35 g. of 17α-amino-9α-fluoro-11β,16α,21-trihydroxy-pregna-1,4-diene-3,20-dione hydrochloride, prepared, as described in Example 7 is contacted with 3 ml. of 39% aqueous formaldehyde at room temperature during 2 days. A precipitate is obtained which is collected by filtering and recrystallized from methanol. Yield 0.19 g. of 9α-fluoro-11β-hydroxy-androsta-1,4-diene-3-one-[17α,16α-d]-oxazolidino-[3′,4′-c]-2H-tetrahydro-1,3-oxazin-5″-one. M.P. 242–250° C.

*Analysis.*—Calculated for $C_{23}H_{28}FNO_6$ (percent): C, 66.2; H, 6.76; N, 3.36. Found (percent): C, 65.89; H, 7.01; N, 3.58.

EXAMPLE 9

Preparation of 9α-fluoro-11β-hydroxy-androsta-1,4-diene-3-one-[17α,16α-d]-2′-methyloxazolidino-[3′,4′-c]-2″-methyl-2H-tetrahydro-1,3-oxazin-5″-one One gram of 17α-amino-9α-fluoro-11β,16α,21-trihydroxy-pregna-1,4-diene-3,20-dione hydrochloride, prepared as described in Example 7 is suspended in 5 ml. of H₂O cooled to 0° C., then additioned with 5 ml. of acetaldehyde. The temperature is allowed to rise to room temperature, then after standing 90 minutes the precipitated crystals are collected by filtering, dried at 80° C. in vacuo and recrystallized from methanol. An amount of 0.91 g. of 9α - fluoro 11β - hydroxy - androsta-1,4 - diene - 3 - one - [17α,16α - d] - 2' - methyloxazolidino - [3',4' - c] - 2'' - methyl - 2H - tetrahydro - 1,3-oxazin-5''-one is obtained. M.P. 260–270° C.

*Analysis.*—Calculated for $C_{25}H_{32}FNO_5$ (percent): C, 67.35; H, 7.24. Found (percent): C, 67.16; H, 7.50.

EXAMPLE 10

Preparation of pregn-4-ene-3,20-dione-[17α,16α-d]-2'-methyloxazolidine

Starting from pregn - 4 - ene - 3,20 - dione - [17α,16α-d]-oxazoline (M.P. 174–176° C.), through the procedure described in Example 1, the compound 17α-amino-16α - hydroxypregn - 4 - ene - 3,20 - dione, M.P. 285° C. (dec.) was prepared. The latter, following the procedure described in Example 4, by treatment with acetic aldehyde gave pregn - 4 - ene - 3,20 - dione - [17α,16α-d]-2'-methyloxazolidine, M.P. 185–187° C.

EXAMPLE 11

Preparation of pregn-4-ene-3,20-dione-[17α,16α-d]-2',2'-dimethyloxazolidine

Starting from 2 g. of 17α - amino - 16α - hydroxypregn-4-ene-3,20-dione, prepared as indicated in the preceding example, dissolved in 20 ml. of dimethoxypropane and 10 ml. of dimethylformamide, and working exactly as described in Example 5, pregn - 4 - ene - 3,20 - dione-[17α,16α-d]-2',2'-dimethyloxazolidine was obtained, M.P. 230–232° C.

EXAMPLE 12

Preparation of pregn-4-ene-3,20-dione-[17α,16α-d]-2'-phenyl-2'-methyloxazolidine The above compound, having M.P. 200–205° C., was prepared by refluxing for 1 hour 2 g. of 17α-amino-16α-hydroxypregn-4-ene-3,20-dione suspended in 20 ml. of benzene and 20 ml. of acetophenone. Benzene is removed by slow distillation at ordinary pressure, the mass is again heated at 100° C. for 1 hour and the excess acetophenone is distilled off in vacuo.

The residue is taken up with diethyl ether, collected on a filter and recrystallized from acetone.

EXAMPLE 13

Preparation of 17α-amino-9α-fluoro-11β,16α,21-trihydroxy-pregna-1,4-diene-3,20-dione 21-benzoate A mixture of 13 g. of 11β,21 - dihydroxy - 9α - fluoropregna - 1,4 - diene - 3,20 - dione - [17α,16α-d]-oxazoline, 50 ml. of pyridine and 13 g. of benzoic anhydride is heated for 1.5 hours on a boiling water bath, then it is poured into 800 ml. of ice water and 50 ml. of concentrated HCl and extracted with chloroform. The 21-benzoate is crystallized from methanol and has M.P. 276–278° C., $[\alpha]_D^{20} + 171.3°$ (c. 1, CHCl₃).

The obtained 11β,21 - dihydroxy - 9α - fluoropregna-1,4 - diene - 3,20 - dione - [17α,16α-d] - oxazoline 21-benzoate (1 g.) is heated for 0.5 hour with 15 ml. of aqueous 20% HCl and 40 ml. of methanol as indicated in Example 1, giving 17 - α - amino - 9α - fluoro-11β,16α, 21-trihydroxypregna - 1,4 - diene - 3,20 - dione 21-benzoate hydrochloride, M.P. 260° C. (dec.), from which the free amine may be prepared through conventional methods, such as treatment with an alkali hydroxide or carbonate and collecting the precipitate on a filter; or extraction with a water immiscible solvent and evaporation of the solvent. M.P. 190° C. (dec.).

EXAMPLE 14

Preparation of 11β,21-dihydroxy-9α-fluoropregna-1,4-diene-3,20-dione-[17α,16α-d]-oxazolidine and 9α-fluoro-11β-hydroxyandrosta-1,4-diene - 3 - one-[16α,17α-d]-oxazolidino-[3',4'-c]-2''-methyl - 2H - tetrahydro-1,3-oxazin-5'-one A mixture of 3 g. of 17α-amino-9α-fluoro-11β,16α,21-trihydroxy-pregna-1,4-diene-3,20-dione 21-benzoate obtained from the preceding example, and 30 ml. of aqueous 36% formaldehyde are allowed to stand overnight under stirring at room temperature. After dilution with water, 3 g. of 11β,21-dihydroxy-9α-fluoro-pregna-1,4-diene-3,20-dione-[α,16α-d]-oxazolidine benzoate are collected. M.P. 266° C. (with decomposition). From the benzoate, the 21-hydroxy steroid is obtained by hydrolysis with methanolic sodium hydroxide at 0° C. for 1 hour. M.P. 226° C. (dec.).

A mixture of 11 g. of the above oxazolidine 50 ml. of water and 60 ml. of acetaldehyde is kept at 0° C. for 2 hours, then 100 ml. of water are added and the mixture is extracted with ethyl acetate. After evaporation of the solvent the residue is crystallized from methanol. The compound is 9α-fluoro-11β-hydroxyandrosta-1,4-diene-3-one-[17α,16α-d]-oxazolidino - [3',4'-c] - 2''-methyl-2H-tetrahydro-1,3-oxazine, M.P. 248–249° C.

EXAMPLE 15

Preparation of 11β,21-dihydroxy-9α-fluoropregna-1,4-diene-3,20-dione-[17α,16α-d]-2'-phenyloxazolidine Starting from the same compound as in Example 14, but using benzaldehyde instead of formaldehyde, the title compound is obtained as the benzoate, M.P. 163°, from which the free 21-hydroxy derivative is obtained by mild alkaline hydrolysis.

EXAMPLE 16

Preparation of 11β,21-dihydroxy-9α-fluoropregna-1,4-diene-3,20-dione-[17α,16α-d]-2'-methyloxazolidine and 9α-fluoro-11β-hydroxyandrosta-1,4-diene - 3 - one-[17α-16α-d]-2'-methyloxazolidino-[3',4'-c] - 2H - tetrahydro-1,3-oxazin-5'-one The former compound is prepared from the same starting compound as in Examples 14 and 15, but using acetaldehyde as the carbonyl reactant. The benzoate has M.P. 241–243° C., and the 21-OH derivative has M.P. 227–228° C. The 21-acetate has M.P. 247–249° C.

The second substance is prepared from the above 21-OH derivative with 36% formaldehyde and methanol at room temperature. M.P. 285° C.

We claim:

1. A process for preparing a 2'-substituted steroidooxazoline of the formula

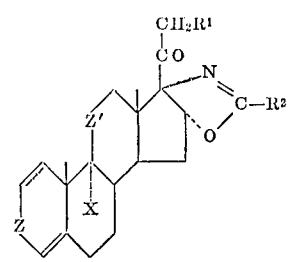

wherein R¹ is a member of the class consisting of hydrogen, hydroxy and acyloxy, R² is a member of the class consisting of lower alkyl and aryl, Z and Z' are members of the class consisting of CHOH and CO, X is a member of the class consisting of hydrogen and halogen or Z' and X together form an additional bond between the carbon atoms in positions 9 and 11 of the steroid ring, and the dotted lines represent optional bonds, which comprises refluxing a 2'-unsubstituted steroido-oxazoline of the formula

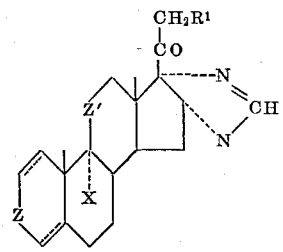

wherein $R^1$, Z, Z' and X have the above significance, with a mixture of dilute aqueous hydrochloric acid and a lower alkanol, and heating the obtained hydrochloride of the 16α-hydroxy-17α-amino-steroid of the formula

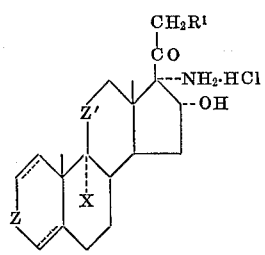

wherein $R^1$, Z, Z' and X have the above significance, with a carboxylic acid anhydride in the presence of a tertiary nitrogen base.

2. A process for preparing a steroido-oxazoline of the formula

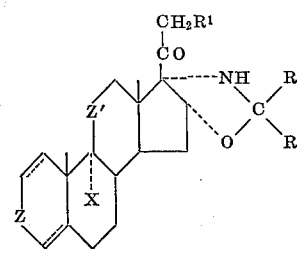

wherein $R^1$ is a member of the class consisting of hydrogen, hydroxy and acyloxy, and each of the symbols R is a member of the class consisting of hydrogen, lower alkyl and aryl; Z, Z' and X have the same significance as in claim 1, which comprises contacting a 16α-hydroxy-17α-aminosteroid of the formula

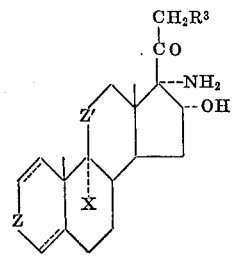

wherein $R^3$ is a member of the class consisting of hydrogen and acyloxy; and Z, Z' and X have the above significance, with a carbonyl compound RCOR, in which the symbols R have the above significance, or a functional derivative thereof, at a temperature between 0° C. and the boiling temperature of the carbonyl compound or its functional derivative, and when $R^3$ is acyloxy, optionally subjecting the compound to hydrolysis to remove the acyl group.

3. A process for preparing a steroid selected from a steroidooxazolidine of Formula I and a steroido-oxazolidino-oxazine of formula II:

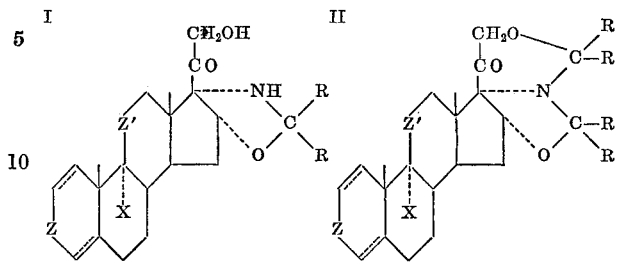

wherein R, Z, Z' and X have the same significance as in claim 1, which comprises contacting a 16α-hydroxy-17α-aminosteroid of the formula

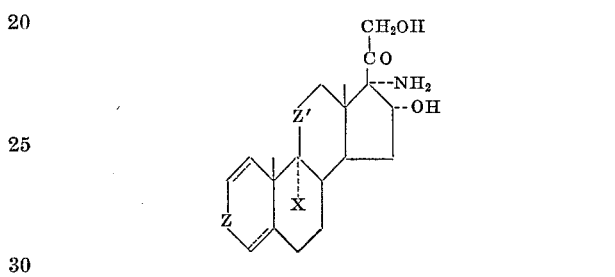

wherein Z, Z' and X have the above significance, with a carbonyl compound of the formula RCOR, in which the symbols R are members of the class consisting of hydrogen, lower alkyl and aryl, or a functional derivative thereof, at a temperature between 0° C. and the boiling temperature between 0° C. and the boiling temperature of the carbonyl compound or its functional derivative.

4. A process for preparing a steroido-oxazolidino-oxazine of the formula

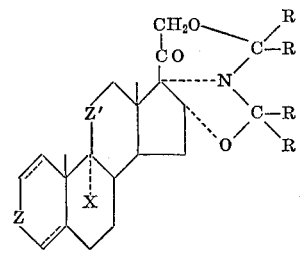

in which the symbols R are members of the class consisting of hydrogen, lower alkyl and aryl, Z, Z' and X have the same significance as in claim 1, which comprises contacting a steroido-oxazolidine of the formula

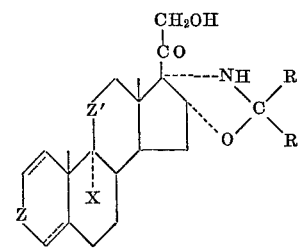

wherein the symbols R, Z, Z' and X have the above significance, with a carbonyl compound of the formula RCOR or a functional derivative thereof, at a temperature between 0° C. and the boiling temperature of the carbonyl compound or its functional derivative.

5. A compound selected from steroids of the formulas

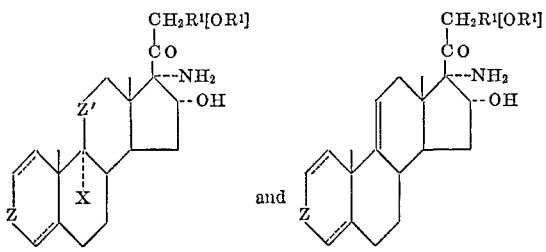

wherein R¹ is a member of the class consisting of hydrogen, hydroxy and aromatic acyloxy, Z and Z' are members of the class consisting of CHOH and CO, X is a member of the class consisting of hydrogen and fluoro, and the dotted lines represent optional bonds.

6. A compound as in claim 5, wherein the steroid is 17α-amino-9α-fluoro - 11β,16α,21 - trihydroxypregna-1,4-diene-3,20-dione.

7. A compound as in claim 5, wherein the steroid is 17α-amino-9α-fluoro - 11β,16α,21 - trihydroxypregna-1,4-diene-3,20-dione-21-benzoate.

8. A compound as in claim 5, wherein the steroid is 17α-amino-16α,21-dihydroxypregna - 1,4,9(11) - triene-3,20-dione.

9. A compound selected from steroids of the formulas

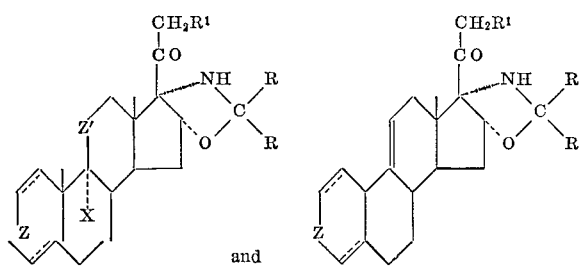

wherein the symbols R are members of the class consisting of hydrogen, methyl and phenyl, R¹ is a member of the class consisting of hydrogen, hydroxy and aromatic acyloxy, Z and Z' are members of the class consisting of CHOH and CO, X is a member of the class consisting of hydrogen and fluoro, and the dotted lines represent optional bonds.

10. A compound as in claim 9, wherein the steroid is 3β,11β-dihydroxy - 5α - pregnane-20-one-[17α,16α-d]-2'-methyloxazolidine.

11. A compound as in claim 9, wherein the steroid is 3β-hydroxy-5α-pregnane - 11,20 - dione-[17α,16α-d]-2',2'-dimethyloxazolidine.

12. A compound as in claim 9, wherein the steroid is 21 - hydroxypregna-1,4,9(11)-triene-3,20-dione-[17α,16α-d]-2'-methyloxazolidine.

13. A compound as in claim 9, wherein the steroid is 9α-fluoro-11β,21-dihydroxypregna - 1,4-diene - 3,20-dione-[17α,16α-d]-2',2'-dimethyloxazolidine.

14. A compound as in claim 9, wherein the steroid is pregn-4-ene-3,20-dione-[17α,16α - d]-2'-phenyl-2'-methyloxazolidine.

15. A compound selected from steroids of the formulas

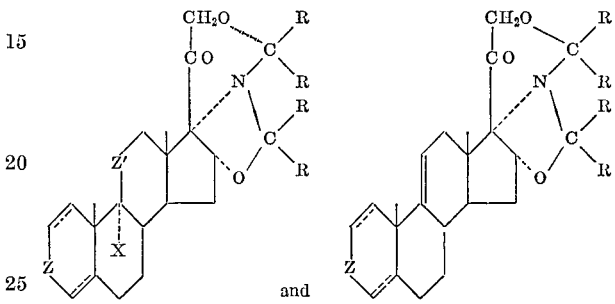

wherein the symbols R are members of the class consisting of hydrogen methyl and phenyl, Z and Z' are members of the class consisting of CHOH and CO, X is a member of the class consisting of hydrogen and fluoro, and the dotted lines represent optional bonds.

16. A compound as in claim 15, wherein the steroid is androsta-1,4,9(11)-triene - 3 - one[17α,16α-d]-2'-methyloxazolidino-[3',4'-c]-2''-methyl - 2H - tetrahydro-1,3-oxazine-5''-one.

17. A compound as in claim 15, wherein the steroid is 9α-fluoro-11β-hydroxyandrosta-1,4-diene - 3 - one-[17α,16α-d]-oxazolidino - [3',4'-c]-2H-tetrahydro-1,3-oxazine-5''-one.

18. A compound as in claim 15, wherein the steroid is 9α-fluoro-11β-hydroxyandrosta-1,4-diene - 3 - one-[17α,16α-d]-2'-methyloxazolidino - [3',4'-c] - 2''-methyl-2H-tetrahydro-1,3-oxazine-5''-one.

No references cited.

ELBERT L. ROBERTS, Primary Examiner

U.S. Cl. X.R.

260—397.45